United States Patent
Champel

(10) Patent No.: US 11,889,125 B2
(45) Date of Patent: Jan. 30, 2024

(54) OMNIDIRECTIONAL MEDIA PLAYBACK METHOD AND DEVICE AND COMPUTER READABLE STORAGE MEDIUM THEREOF

(71) Applicant: BEIJING XIAOMI MOBILE SOFTWARE CO., LTD., Beijing (CN)

(72) Inventor: Mary-Luc Georges Henry Champel, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 53 days.

(21) Appl. No.: 17/620,959

(22) PCT Filed: Jun. 25, 2019

(86) PCT No.: PCT/CN2019/092846
§ 371 (c)(1),
(2) Date: Dec. 20, 2021

(87) PCT Pub. No.: WO2020/258047
PCT Pub. Date: Dec. 30, 2020

(65) Prior Publication Data
US 2022/0329879 A1    Oct. 13, 2022

(51) Int. Cl.
*H04N 21/218*    (2011.01)
*H04N 21/262*    (2011.01)
*H04N 21/81*     (2011.01)
*H04N 21/845*    (2011.01)
*H04N 21/854*    (2011.01)

(52) U.S. Cl.
CPC . *H04N 21/21805* (2013.01); *H04N 21/26258* (2013.01); *H04N 21/816* (2013.01); *H04N 21/8456* (2013.01); *H04N 21/85406* (2013.01)

(58) Field of Classification Search
CPC ....... H04N 21/21805; H04N 21/26258; H04N 21/816; H04N 21/8456; H04N 21/85406
See application file for complete search history.

(56) References Cited

U.S. PATENT DOCUMENTS

| | | |
|---|---|---|
| 2014/0363141 A1 | 12/2014 | Bonhomme et al. |
| 2015/0296195 A1 | 10/2015 | Greene et al. |
| 2017/0142389 A1 | 5/2017 | Yang et al. |

(Continued)

FOREIGN PATENT DOCUMENTS

JP    2018110375 A    7/2018

OTHER PUBLICATIONS

European Patent Application No. 19918519.0 extended European search report dated Jul. 27, 2021, 10 pages.

(Continued)

*Primary Examiner* — Thai Q Tran
*Assistant Examiner* — Jose M Mesa
(74) *Attorney, Agent, or Firm* — COZEN O'CONNOR

(57) ABSTRACT

An omnidirectional media playback method, a terminal device and a computer readable storage medium. The method comprises: obtaining viewpoint looping information associated to a current viewpoint from omnidirectional media data (S202); and looping the current viewpoint according to the viewpoint looping information (S204). A mechanism for allowing viewpoint looping is provided and information about the viewpoint looping is defined.

11 Claims, 3 Drawing Sheets

(56) References Cited

U.S. PATENT DOCUMENTS

2019/0037278 A1* 1/2019 Ahonen .......... H04N 21/44012

OTHER PUBLICATIONS

International Patent Application No. PCT/CN2019/092846 International Search Report and Written Opinion dated Mar. 31, 2020, 7 pages.
European Patent Application No. 19918519.0, Office Action dated Mar. 18, 2022, 7 pages.
Indian Patent Application No. 202247003374, Office Action dated Apr. 21, 2022, 5 pages.
Japanese Patent Application No. 2021-573926, Office Action dated Jan. 27, 2023, 5 pages.
Japanese Patent Application No. 2021-573926, English translation of Office Action dated Jan. 27, 2023, 5 pages.

* cited by examiner

OMNIDIRECTIONAL MEDIA PLAYBACK METHOD AND DEVICE AND COMPUTER READABLE STORAGE MEDIUM THEREOF

CROSS-REFERENCE TO RELATED APPLICATION

This application is a U.S. national phase of International Application No. PCT/CN2019/092846, filed with the State Intellectual Property Office of P. R. China on Jun. 25, 2019, the content of which is incorporated herein by reference in its entirety.

TECHNICAL FIELD

The present disclosure relates to the field of omnidirectional media technologies, and more particularly, to an omnidirectional media playback method and a terminal device and a non-transitory computer readable storage medium thereof.

BACKGROUND

When omnidirectional media content is consumed with a head-mounted display and headphones, only the parts of the media that correspond to the user's viewing orientation are rendered, as if the user were in the spot where and when the media was captured. One of the most popular forms of omnidirectional media applications is omnidirectional video, also known as 360° video. Omnidirectional video is typically captured by multiple cameras that cover up to 360° of the scene. Compared to traditional media application formats, the end-to-end technology for omnidirectional video (from capture to playback) is more easily fragmented due to various capturing and video projection technologies.

The above information disclosed in this Background section is only for enhancement of understanding of the background of the disclosure and therefore it may contain information that does not form the prior art that is already known to a person of ordinary skill in the art.

SUMMARY

The present disclosure provides an omnidirectional media playback method and a terminal device and a non-transitory computer readable storage medium.

In a first aspect, the present disclosure provides omnidirectional media playback method, comprising: obtaining viewpoint looping information associate to current viewpoint from omnidirectional media data; and looping the current viewpoint according to the viewpoint looping information.

In a second aspect, the present disclosure provides a terminal device, comprising: a processor and a memory. The memory is configured to store instructions executable by the processor, wherein the processor is configured to perform the steps of any one of the method as described in the first aspect above-described or otherwise described herein.

In the third aspect, the present disclosure provides a non-transitory computer readable storage medium having instructions stored thereon that, when executed by a processor, implement the steps of any one of the methods in the above-described first aspect.

This section provides a summary of various implementations or examples of the technology described in the disclosure, and is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
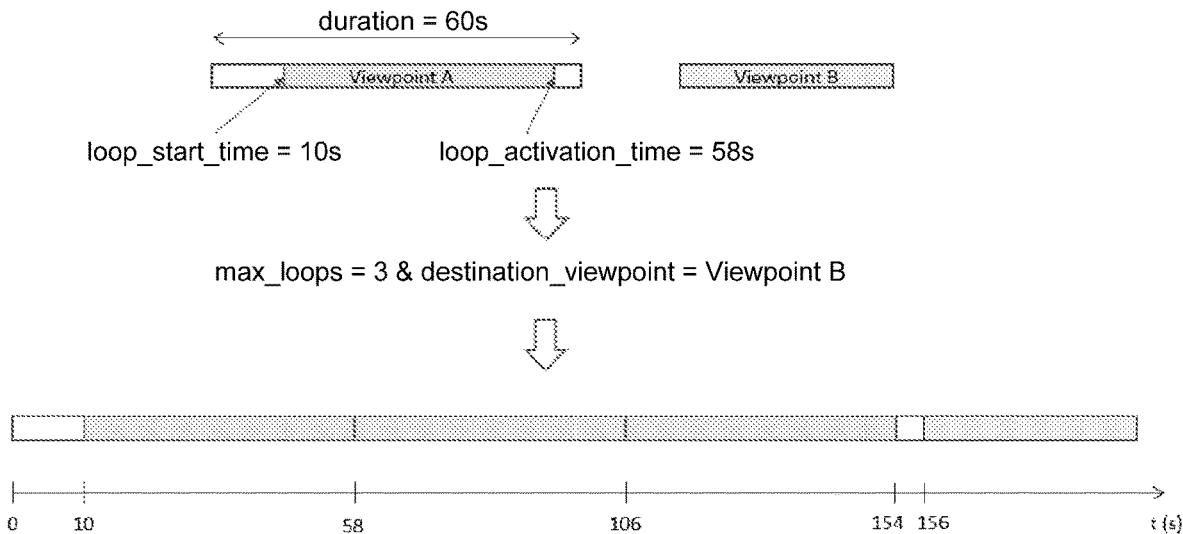
FIG. 1 schematically illustrates an example of an OMAF application according to a possible scenario.

Example embodiments of the disclosure will now be described more fully with reference to the accompanying drawings, in which example embodiments are shown. Example embodiments of the disclosure may, however, be embodied in many different forms and should not be construed as being limited to the embodiments set forth herein; rather, these embodiments are provided so that this disclosure will be thorough and complete, and will fully convey the concept of example embodiments to those skilled in the art. In the drawings, the thicknesses of layers and regions are exaggerated for clarity. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, materials, or operations are not shown or described in detail to avoid obscuring aspects of the disclosure.

When omnidirectional media content is consumed with a head-mounted display and headphones, only the parts of the media that correspond to the user's viewing orientation are rendered, as if the user were in the spot where and when the media was captured. One of the most popular forms of omnidirectional media applications is omnidirectional video, also known as 360° video. Omnidirectional video is typically captured by multiple cameras that cover up to 360° of the scene. Compared to traditional media application formats, the end-to-end technology for omnidirectional video (from capture to playback) is more easily fragmented due to various capturing and video projection technologies. From the capture side, there exist many different types of cameras capable of capturing 360° video, and on the playback side there are many different devices that are able to playback 360° video with different processing capabilities. To avoid fragmentation of omnidirectional media content and devices, a standardized format for omnidirectional media applications is specified in OMAF (Omnidirectional MediA Format) standard.

OMAF defines a media format that enables omnidirectional media applications, focusing on 360° video, images, and audio, as well as associated timed text.

Since early 2018, MPEG (Moving Picture Experts Group) has initiated new technical work in this area in prevision of a new version of OMAF specification.

In the new version of OMAF specification, multiple viewpoints within a signal OMAF application are supported. Based on multiple viewpoints, a new scenario about looping viewpoints within a single OMAF is proposed.

FIG. 1 schematically illustrates an example of an OMAF application according to a possible storytelling scenario. Referring to FIG. 1, the OMAF application is built around two viewpoints A and B. The following characteristics are used to define loops within the viewpoint A:

The viewpoint A duration is 60 seconds.
The viewpoint A loop start time is positioned at 10 seconds from beginning of viewpoint A media.
The viewpoint A activation time is positioned at 58 seconds from beginning of viewpoint A media.
Maximum number of loops of viewpoint A is 3.
Playing out transitions to the viewpoint B occurs after the viewpoint A terminates.

Based on the above information, such arrangement of the viewpoints in the possible storytelling scenario will be described with reference to FIG. 1.

The user enters a gloomy room (e.g. the viewpoint A). After 10 seconds, the ceiling light is switched on and the user can much better see the environment and he can see two outgoing doors. After 30 seconds, a slamming noise comes from one of the two doors, suggesting that the user may go through this door.

If the user is watching in the direction of that door, he can see that the door slams, strongly suggesting that he should go there.

If the user is not watching in the direction of that door, he may only get a hint that something happens in that direction. The portion of the viewpoint A between 10 seconds and 58 seconds is played up to three times, thus giving the user three opportunities to better notice the door slamming.

If the user decides to interact with that door, he transitions to another room (e.g. another viewpoint C).

But if he does not interact with it, the following events may happen: after three loops of the viewpoint A, at 154 seconds, the main light is switched off; and 2 seconds later, at 156 seconds, the user transitions to another room through the non-slamming door (e.g. the viewpoint B).

It can be seen from the above that in terms of storytelling, content producers expect more capabilities with regard to looping some of the viewpoint(s) in an OMAF application, so that one or more viewpoints in the OMAF application can be played back one or more times.

Figure 2:
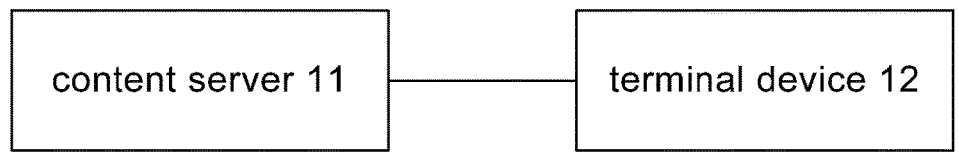
FIG. 2 schematically illustrates a system architecture for omnidirectional media playback according to an embodiment of the present disclosure.

FIG. 2 schematically illustrates architecture of a system for omnidirectional media playback according to an embodiment of the present disclosure.

Referring to FIG. 2, the system 10 may comprise: content server 11 and terminal device 12. The content server 11 is deployed, for example, by content producers or content providers. And the content server 11 may be a single server, or a distributed server cluster. The omnidirectional media data with a predetermined media container file format are stored in the content server 11. In embodiments of the present disclosure, the media container file format takes the ISO Base Media File Format (ISOBMFF) as an example, but the present disclosure is not limited thereto.

The omnidirectional media data can be obtained, for example, according to the following process.

A real-world audio-visual scene is captured by audio sensors as well as a set of cameras or a camera device with multiple lenses and sensors. The acquisition results in a set of digital image/video and audio signals. The cameras/lenses typically cover all directions around the center point of the camera set or camera device, thus the name of 360-degree video.

Audio may be captured using many different microphone configurations and stored as a plurality of different content formats, including channel-based signals, static or dynamic (i.e. moving through the 3D scene) object signals, and scene-based signals (e.g., Higher Order Ambisonics). The channel-based signals typically conform to one of the loudspeaker layouts. In an omnidirectional media application, the loudspeaker layout signals of the rendered immersive audio program are binauralized for presentation via headphones.

The images of the same time instance are stitched, possibly rotated, projected, and mapped onto a packed picture.

For audio, the stitching process is not needed, since the captured signals are inherently immersive and omnidirectional.

The packed pictures are encoded as coded images or a coded video bitstream. The captured audio is encoded as an audio bitstream. The coded images, video, and/or audio are then composed into a sequence of an initialization segment and media segments for streaming, according to the above-mentioned media container file format. The file encapsulator also includes metadata into the segments, such as projection and region-wise packing information assisting in rendering the decoded packed pictures.

The segments are stored in the content server 11 for being delivered to the terminal device 12 using a delivery mechanism. The delivery mechanism may be, for example, dynamic adaptive streaming over HTTP (DASH) or MPEG media transport (MMT).

The terminal device 12, as an OMAF player, may be a device including a head-mounted display or any other display and a headphone.

In the terminal device 12, a file decapsulator processes the received segments and extracts the coded bitstreams and parses the metadata. The audio, video, and/or images are then decoded into decoded signals. The decoded packed pictures are projected onto the screen of the head-mounted display or any other display device based on the current viewing orientation or viewport and the projection, spherical coverage, rotation, and region-wise packing metadata parsed from the file. Likewise, decoded audio is rendered, e.g. through the headphone, according to the current viewing orientation. The current viewing orientation is determined by the head tracking and possibly also eye tracking functionality. Besides being used by the renderer to render the appropriate part of decoded video and audio signals, the current viewing orientation may also be used by the video and audio decoders for decoding optimization.

In embodiments of the present disclosure, as to live use case, the coded images, video, and/or audio may also be composed into a media file for file playback. The media file also includes the abovementioned metadata. In the terminal device 12, the file that the decapsulator inputs is identical to the media file. The file decapsulator also processes the file and extracts the coded bitstreams and parses the metadata. The process is as described above, and will not be described here.

In related art, the current working draft of OMAF defines viewpoints by the following ISOBMFF structures: ViewpointPosStruct( ) ViewpointGlobalCoordinateSysRotationStruct( ), ViewpointGroupStruct( ) and ViewpointEntry( ) ViewpointPosStruct( ) defines the position of the viewpoint in the global coordinate system, possibly with GPS information as well. ViewpointGlobalCoordinateSysRotationStruct( ) defines the orientation of the viewpoint in the global coordinate system. And ViewpointGroupStruct( ) provides viewpoint group information. ViewpointEntry( ) defines a viewpoint_id unique for each viewpoint.

In order to describe all characteristics of a looping viewpoint, embodiments of the present disclosure propose an additional data structure for defining viewpoint looping information associated to every single viewpoint from which a looping exists. Thus, it becomes possible to describe OMAF application in which part of the VR content (understand a time portion of a single viewpoint) loops.

This additional data structure includes elements that are characteristics of the looping, for example, a maximum number of loops, a destination viewpoint, loop activation time and loop start time.

Wherein, the element of maximum number of loops is configured to indicate the maximum number of loops of a viewpoint. In embodiments of the present disclosure, infinite loops are allowed. For example, the element of maximum number of loops is configured to be set to a specific value (e.g. −1) to indicate infinite loops. Optionally, absence of the element of maximum number of loops is configured to indicate infinite loops.

The element of destination viewpoint is configured to indicate the destination viewpoint to switch to after the maximum number of loops of a current viewpoint has been reached. If number of loops is infinite loops, the element of destination viewpoint will be absent.

In related art, a new data structure for defining viewpoint switching information (e.g. ViewpointSwitchingStruct( )) has been proposed. This data structure also includes the element of destination viewpoint, which is configured to indicate the destination viewpoint of a viewpoint switching to. In embodiments of the present disclosure, if the presence of such data structure allows to define viewpoint switching information, the data structure for defining the viewpoint looping information shall not include the element of destination viewpoint.

The element of loop activation time is configured to indicate the time in the timeline of an omnidirectional media associated to the current viewpoint at which looping shall occur. Taking the scenario shown in FIG. 1 as an example, the loop activation time is as shown by loop activation time.

The element of loop starting time is configured to indicate time in the timeline of the omnidirectional media associated to the current viewpoint at which the playout shall switch to when looping occurs. Also taking the scenario shown in FIG. 1 as an example, the loop start time is as shown by loop start time.

The following ISOBMFF grammar is a possible embodiment of the present disclosure.

```
aligned(8) class ViewpointLoopingStruct ( ) {
   unsigned int(1) max_loops_flag;
   unsigned int(1) destination_viewpoint_flag;
   unsigned int(1) loop_activation_flag;
   unsigned int(1) loop_start_flag;
   bit(4) reserved = 0;
   if (max_loops_flag) { signed int(8) max_loops; }   // −1 for infinite loops
   if (destination_viewpoint_flag) {
      unsigned int(16) destination_viewpoint_id;
   }
   if (loop_activation_flag) { signed int(32) loop_activation_time; }
   if (loop_start_flag) { signed int(32) loop_start_time; }
}
```

The following semantics are associated to the possible ISOBMFF grammar embodiment defined herebefore:

max_loops_flag equal to 1 specifies that a maximum number of loops information is present.

destination_viewpoint_flag equal to 1 specifies that a destination viewpoint information is present.

loop_activation_flag equal to 1 specifies that a loop activation time information is present.

loop_start_flag equal to 1 specifies that a loop start time information is present.

max_loops indicates the maximum number of loops that the OMAF player shall perform on the current viewpoint. If value is set to −1, the OMAF player shall keep looping the current viewpoint infinitely or until user interactions with the player or the VR content puts an end to it. If max_loops_flag is equal to 0 and no max_loops information is set, max_loops shall be set to its default value of −1 (infinite loops).

destination_viewpoint_id indicates the viewpoint_id of the destination viewpoint of a viewpoint switching that shall occur at the end of the playout of the current viewpoint once maximum number of loops (max_loops) has been reached.

loop_activation_time indicates the time in the media timeline of the current viewpoint at which loop shall be initiated. If no loop_activation_time is present, loop shall occur at the end of the media timeline of the current viewpoint.

loop_start_time indicates the time in the media timeline of the current viewpoint at which playout of the current viewpoint shall restart when a loop is performed. If no loop_start_time is present, playout shall start at the beginning of the media timeline of the current viewpoint.

Based on the defining of the new data structure about viewpoint looping, firstly, the content producer may precisely use a fixed number of loops instead of an infinite number, which allows to have a better management of content media timeline for the content producer. Secondly, the content producer may precisely use start time for the loop instead of always having the playout of the viewpoint restarting at the very beginning. And the content producer may also precisely use activation time for the loop instead of always having loops being initiated at the end of the viewpoint playout, which allows for instance to define some additional content (within the viewpoint) that is played after the maximum number of loops has been reached. Seamless transition at the time of loop is also made easier for the content producer when it is possible to define boundaries for the loop itself (activation time and start time). Furthermore, the content producer may also precisely use another transition effect that shall happen at the end of the viewpoint playout once maximum number of loops has been reached.

Next, an omnidirectional media playback method provided by the embodiments of the present disclosure will be introduced.

Figure 3:
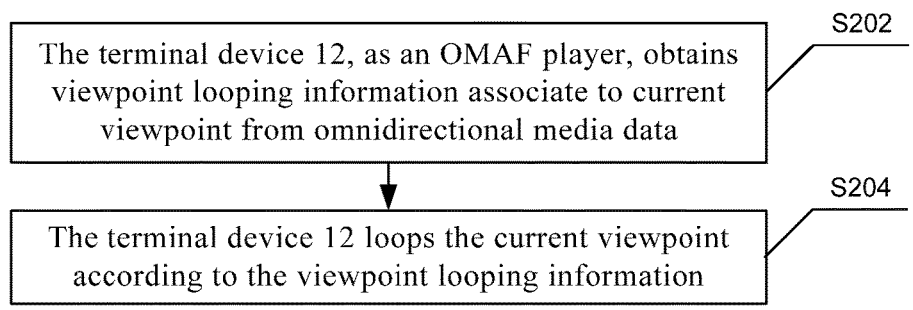
FIG. 3 schematically illustrates a flowchart of an omnidirectional media playback method according to an embodiment of the present disclosure.

FIG. 3 schematically illustrates a flowchart of an omnidirectional media playback method according to an embodiment of the present disclosure. The method may be applied, for example, to the terminal device 12 in FIG. 2.

Referring to FIG. 3, the method 20 comprises:

In Step S202, the terminal device 12, as an OMAF player, obtains viewpoint looping information associated to a current viewpoint from omnidirectional media data.

As mentioned above, if the current viewpoint needs to be played back a plurality of times, the viewpoint looping information associated to the current viewpoint shall be included in the omnidirectional media data. Then, the OMAF player can obtain the viewpoint looping information associated to the current viewpoint from the omnidirectional media data.

In Step S204, the terminal device 12 loops the current viewpoint according to the viewpoint looping information.

In embodiments of the present disclosure, the viewpoint looping information may comprise: a maximum number of loops, loop start time and loop activation time. The maximum number of loops is configured to indicate the maximum number of loops that OMAF player shall perform on the current viewpoint, the start time is configured to indicate time in an omnidirectional media timeline of the current viewpoint at which playout of the current viewpoint shall restart when a loop is performed, and the loop activation time is configured to indicate time in the omnidirectional media timeline of the current viewpoint at which the loop shall be initiated.

In embodiments of the present disclosure, the viewpoint looping information further comprises: a destination viewpoint configured to indicate a viewpoint ID of the destination viewpoint of a viewpoint switching that shall occur at the end of the playout of the current viewpoint once the maximum number of loops has been reached.

Figure 4:
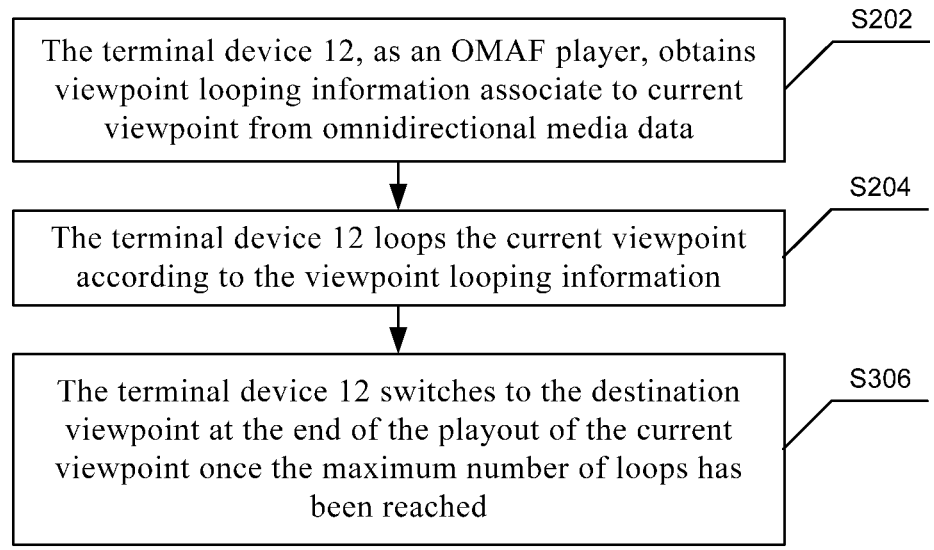
FIG. 4 schematically illustrates a flowchart of an omnidirectional media playback method according to another embodiment of the present disclosure.

FIG. 4 schematically illustrates a flowchart of an omnidirectional media playback method according to another embodiment of the present disclosure. If the destination viewpoint is present in the viewpoint looping information, as shown in FIG. 4, the method 20 may further comprise:

in Step S306, the terminal device 12 switches to the destination viewpoint at the end of the playout of the current viewpoint once the maximum number of loops has been reached.

In embodiments of the present disclosure, as mentioned above, if viewpoint switching information associated to the current viewpoint is defined, the OMAF player shall obtain the destination viewpoint from the viewpoint switching information to determine the destination viewpoint of the current viewpoint switching to. The viewpoint switching information may be defined as an ISOBMFF structure.

Figure 5:
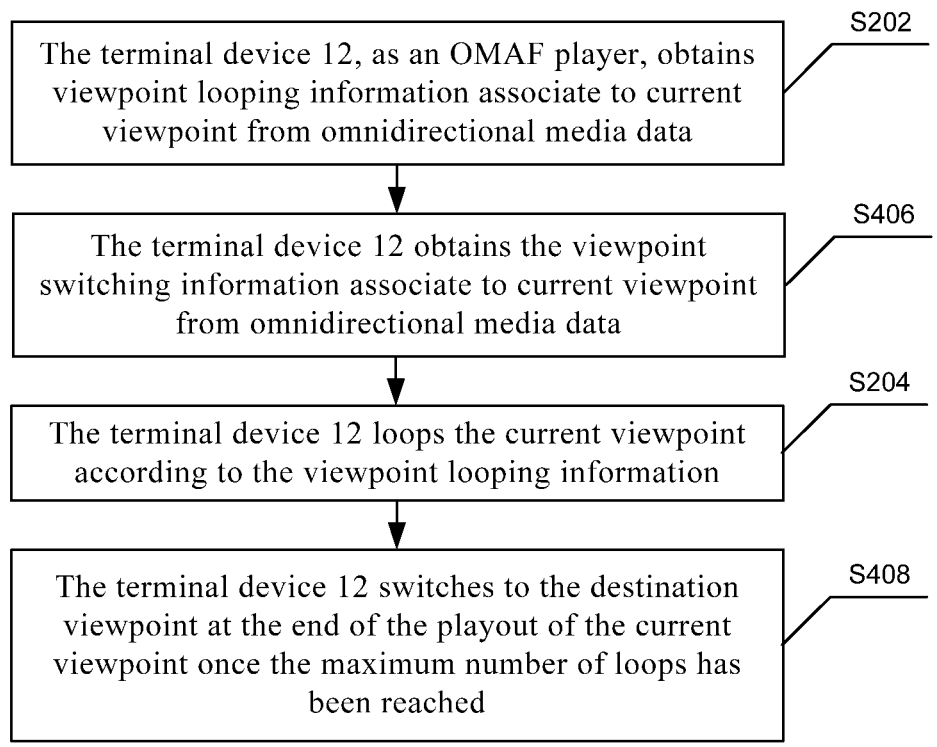
FIG. 5 schematically illustrates a flowchart of an omnidirectional media playback method according to another embodiment of the present disclosure.

FIG. 5 schematically illustrates a flowchart of an omnidirectional media playback method according to another embodiment of the present disclosure. If the viewpoint switching information associated to current viewpoint is defined, as shown in FIG. 5, the method 20 may further comprise:

In Step S406, the terminal device 12 obtains the viewpoint switching information associated to the current viewpoint from omnidirectional media data.

The viewpoint switching information comprises: a destination viewpoint configured to indicate the destination viewpoint of the current viewpoint switching to.

It should be noted that, as shown in FIG. 5, this Step shall be performed before step S204. It means that the terminal device 12 shall obtain the viewpoint switching information before looping the current viewpoint.

In Step S408, the terminal device 12 switches to the destination viewpoint at the end of the playout of the current viewpoint once the maximum number of loops has been reached.

In embodiments of the present disclosure, if a value of the maximum number is set to a predefined value (e.g. −1) or if the element of maximum number of loops is not present in the viewpoint looping information, the maximum number of loops is infinite. That is the OMAF player shall keep looping the current viewpoint infinitely or until a user interacts with the player or the VR content puts an end to it.

In embodiments of the present disclosure, if the loop start time is not present in the viewpoint looping information, the playout shall start at the beginning of the omnidirectional media timeline of the current viewpoint.

In embodiments of the present disclosure, if the loop activation time is not present in the viewpoint looping information, a loop shall occur at the end of the omnidirectional media timeline of the current viewpoint.

In embodiments of the present disclosure, the viewpoint looping information is defined as an ISOBMFF structure, e.g. the abovementioned ISOBMFF structure ViewpointLoopingStruct( ).

According to the omnidirectional media playback method in above embodiments of the present disclosure, firstly, a content producer may precisely use a fixed number of loops instead of an infinite number, which allows to have a better management of content media timeline for the content producer. Secondly, the content producer may precisely use start time for the loop instead of always having the playout of the viewpoint restarting at the very beginning. And the content producer may also precisely use activation time for the loop instead of always having loops being initiated at the end of the viewpoint playout, which allows for instance to define some additional content (within the viewpoint) that is played after the maximum number of loops has been reached. Seamless transition at the time of loop is also made easier for the content producer when it is possible to define boundaries for the loop itself (activation time and start time). Furthermore, the content producer may also precisely use another transition effect that shall happen at the end of the viewpoint playout once the maximum number of loops has been reached.

Next, a device for omnidirectional media playback provided by an embodiment of the present disclosure will be introduced.

Figure 6:
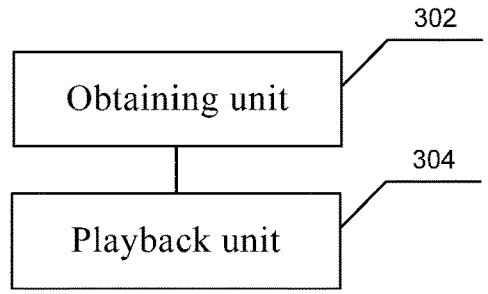
FIG. 6 schematically illustrates a block diagram of a device for omnidirectional media playback according to an embodiment of the present disclosure.

FIG. 6 schematically illustrates a block diagram of a device for omnidirectional media playback according to an embodiment of the present disclosure.

Referring FIG. 6, the device 30 includes: an obtaining unit 302 and a playback unit 304.

The obtaining unit 302 is configured to obtain viewpoint looping information associated to a current viewpoint from omnidirectional media data.

The playback unit 304 is configured to loop the current viewpoint according to the viewpoint looping information.

In embodiments of the present disclosure, the viewpoint looping information comprises: a maximum number of loops, loop start time and loop activation time, the maximum number of loops is configured to indicate the maximum number of loops that OMAF player shall perform on the current viewpoint, the start time is configured to indicate time in an omnidirectional media timeline of the current viewpoint at which playout of the current viewpoint shall restart when a loop is performed, and the loop activation time is configured to indicate time in the omnidirectional media timeline of the current viewpoint at which loop shall be initiated.

In embodiments of the present disclosure, the viewpoint looping information further comprises: a destination viewpoint configured to indicate a viewpoint ID of the destination viewpoint of a viewpoint switching that shall occur at the end of the playout of the current viewpoint once the maximum number of loops has been reached, and the playback unit is further configured to switch to the destination viewpoint at the end of the playout of the current viewpoint once the maximum number of loops has been reached.

In embodiments of the present disclosure, the obtaining unit is further configured to obtain viewpoint switching information associated to the current viewpoint from omnidirectional media data, the viewpoint switching information comprises: a destination viewpoint configured to indicate the destination viewpoint of the current viewpoint switching to, and the playback unit is further configured to switch to the destination viewpoint at the end of the playout of the current viewpoint once the maximum number of loops has been reached.

In embodiments of the present disclosure, if a value of the maximum number is set to a predefined value or if the element of maximum number of loops is no present in the viewpoint looping information, the maximum number of loops is infinite.

In embodiments of the present disclosure, if the loop start time is not present in the viewpoint looping information, the playout shall start at the beginning of the omnidirectional media timeline of the current viewpoint.

In embodiments of the present disclosure, if the loop activation time is not present in the viewpoint looping information, a loop shall occur at the end of the omnidirectional media timeline of the current viewpoint.

In embodiments of the present disclosure, the viewpoint looping information is defined as an ISOBMFF structure, e.g. the abovementioned ISOBMFF structure ViewpointLoopingStruct( ).

According to the device for omnidirectional media playback in above embodiments of the present disclosure, firstly, the content producer may precisely use a fixed number of loops instead of an infinite number, which allows to have a better management of content media timeline for a content producer. Secondly, the content producer may precisely use start time for the loop instead of always having the playout of the viewpoint restarting at the very beginning. And the content producer may also precisely use activation time for the loop instead of always having loops being initiated at the end of the viewpoint playout, which allows for instance to define some additional content (within the viewpoint) that is played after the maximum number of loops has been reached. Seamless transition at the time of loop is also made easier for the content producer when it is possible to define boundaries for the loop itself (activation time and start time). Furthermore, the content producer may also precisely use another transition effect that shall happen at the end of the viewpoint playout once the maximum number of loops has been reached.

Figure 7:
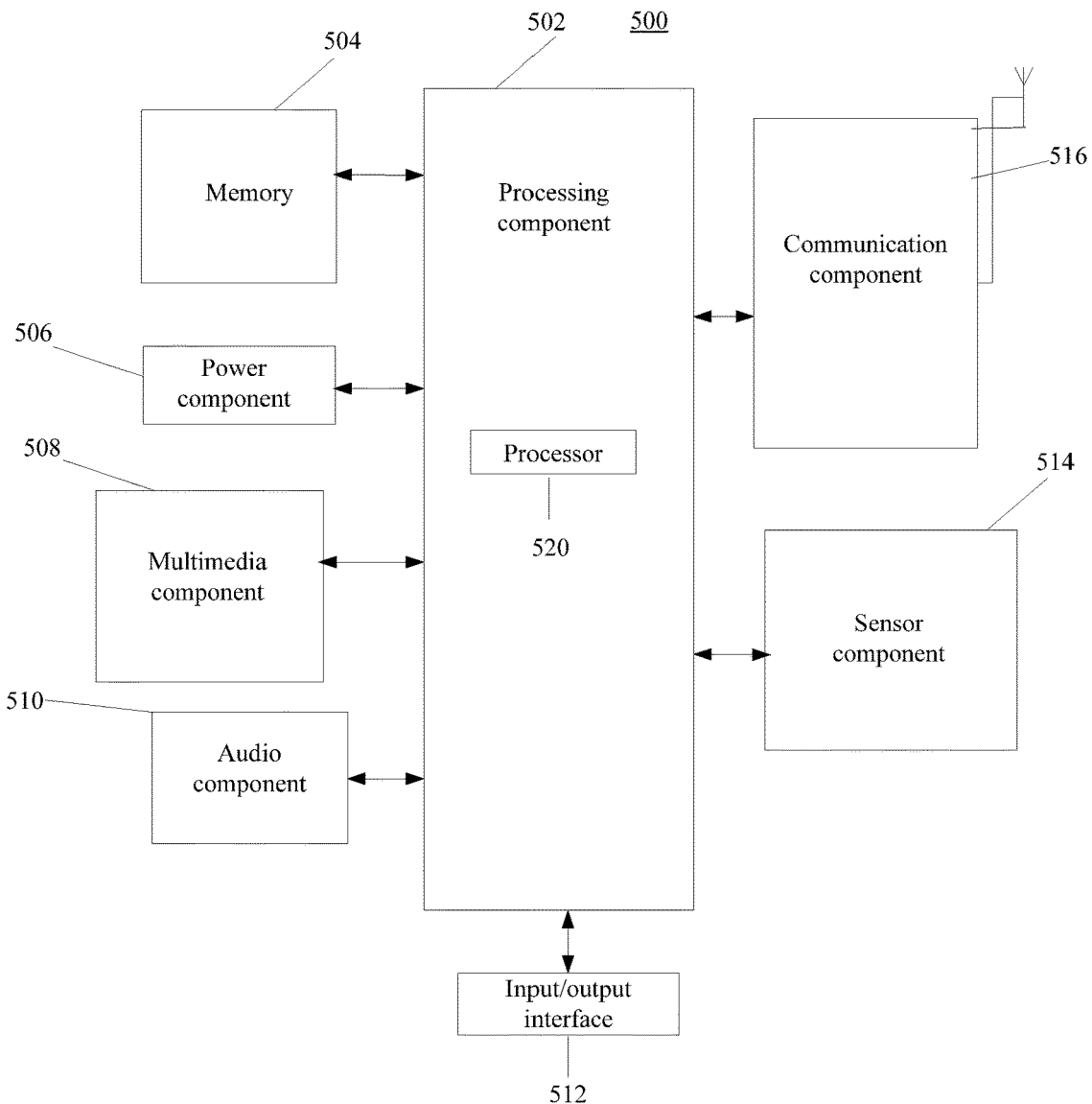
FIG. 7 schematically illustrates a block diagram of a terminal device according to an embodiment of the present disclosure.

FIG. 7 schematically illustrates a block diagram of a terminal device according to an embodiment of the present disclosure. For example, the terminal device 500 may be an OMAF player, a game console, a mobile phone, and the like.

Referring to FIG. 7, the terminal device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the terminal device 500, such as the operations associated with display, data communications and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the terminal device 500. Examples of such data include instructions for any applications or methods operated on the terminal device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The power component 506 provides power to various components of the terminal device 500. The power component 506 may include a power management system, one or more power sources, and any other components associated with the generation, management, and distribution of power in the terminal device 500.

The multimedia component 508 may include a head-mounted display or any other display providing an output interface between the terminal device 500 and a user. In addition, the multimedia component 508 may include a screen providing an output interface between the terminal device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 508 includes a front camera and/or a rear camera. The front camera and the rear camera may receive an external multimedia data while the terminal device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a headphone configured to receive an external audio signal. The received audio signal may be further stored in the memory 504 or transmitted via the communication component 516. In some embodiments, the audio component 510 further includes a speaker for outputting audio signals.

The I/O interface 512 provides an interface between the processing component 502 and peripheral interface modules such as a keyboard, a click wheel, buttons, and the like. The buttons may include, but are not limited to, a home button, a volume button, a start button or a lock button.

The sensor component 514 includes one or more sensors to provide status assessments of various aspects of the terminal device 500. For instance, the sensor component 514 may detect an open/close status of the terminal device 500, relative positioning of components, e.g., may be the display and the keypad of the terminal device 500, may detect a change in position of the terminal device 500 or a component of the terminal device 500, a presence or absence of user contact with the terminal device 500, an orientation or an acceleration/deceleration of the terminal device 500 and a change in temperature of the terminal device 500. The sensor component 514 may include a proximity sensor configured to detect the presence of nearby objects without any physical contact. The sensor component 514 may include a light sensor, such as a CMOS or CCD image sensor, for use in imaging applications as well. In some embodiments, the sensor component 514 may include an accelerometer sensor, a gyroscope sensor, a magnetic sensor, a pressure sensor, or a temperature sensor as well.

The communication component 516 is configured to facilitate communication, wired or wirelessly, between the terminal device 500 and other devices. The terminal device 500 can access a wireless network based on a communication standard, such as WiFi, 2G, or 3G, or 4G, or 5G, or a combination thereof. In one exemplary embodiment, the communication component 516 receives a broadcast signal or broadcast-associated information from an external broadcast management system via a broadcast channel. In one exemplary embodiment, the communication component 516 further includes a near field communication (NFC) module to facilitate short-range communication. For example, the NFC module may be realized based on a radio frequency identification (RFID) technology, an infrared data association (IrDA) technology, an ultra-wideband (UWB) technology, a Bluetooth (BT) technology or other technologies.

In exemplary embodiments, the terminal device 500 may be realized with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing operations carried out by the terminal device in the omnidirectional media playback method provided by the embodiment illustrated in FIG. 3 to FIG. 5.

A non-transitory computer readable storage medium, when instructions in the storage medium are executed by a processor of a terminal device, makes the terminal device enabled to perform related steps in the omnidirectional media playback method provided by the embodiment illustrated in FIG. 3 to FIG. 5.

Exemplary embodiments have been specifically shown and described as above. It will be appreciated by those skilled in the art that the disclosure is not limited by the disclosed embodiments; rather, all suitable modifications and equivalent which come within the spirit and scope of the appended claims are intended to fall within the scope of the disclosure.

What is claimed is:

1. An omnidirectional media playback method, comprising:

obtaining viewpoint looping information associated to a current viewpoint from omnidirectional media data; and looping the current viewpoint according to the viewpoint looping information;

wherein the viewpoint looping information comprises: a maximum number of loops, loop start time and loop activation time;

wherein the maximum number of loops is configured to indicate the maximum number of loops that OMAF player shall perform on the current viewpoint, the loop start time is configured to indicate time in an omnidirectional media timeline of the current viewpoint at which playout of the current viewpoint shall restart when a loop is performed, and the loop activation time is configured to indicate time in the omnidirectional media timeline of the current viewpoint at which the loop shall be initiated;

wherein the viewpoint looping information comprises: a destination viewpoint configured to indicate a viewpoint ID of the destination viewpoint of a viewpoint switching that shall occur at the end of the playout of the current viewpoint once the maximum number of loops has been reached, and the method further comprises:

switching to the destination viewpoint at the end of the playout of the current viewpoint once the maximum number of loops has been reached.

2. The method in accordance with claim 1, wherein when a value of the maximum number is set to a predefined value or if an element of maximum number of loops is no present in the viewpoint looping information, the maximum number of loops is infinite.

3. The method in accordance with claim 1, wherein when the loop start time is not present in the viewpoint looping information, the playout shall start at the beginning of the omnidirectional media timeline of the current viewpoint.

4. The method in accordance with claim 1, wherein when the loop activation time is not present in the viewpoint looping information, a loop shall occur at the end of the omnidirectional media timeline of the current viewpoint.

5. The method in accordance with claim 1, wherein the viewpoint looping information is defined as an ISOBMFF structure.

6. A terminal device, comprising:

a processor;

a memory configured to store instructions executable by the processor, wherein the processor is configured to perform an omnidirectional media playback method, comprising:

obtaining viewpoint looping information associated to a current viewpoint from omnidirectional media data; and looping the current viewpoint according to the viewpoint looping information;

wherein the viewpoint looping information comprises: a maximum number of loops, loop start time and loop activation time;

wherein the maximum number of loops is configured to indicate the maximum number of loops that OMAF player shall perform on the current viewpoint, the loop start time is configured to indicate time in an omnidirectional media timeline of the current viewpoint at which playout of the current viewpoint shall restart when a loop is performed, and the loop activation time is configured to indicate time in the omnidirectional media timeline of the current viewpoint at which the loop shall be initiated;

wherein the viewpoint looping information comprises: a destination viewpoint configured to indicate a viewpoint ID of the destination viewpoint of a viewpoint switching that shall occur at the end of the playout of the current viewpoint once the maximum number of loops has been reached, and the processor is further configured to perform the following:

switching to the destination viewpoint at the end of the playout of the current viewpoint once the maximum number of loops has been reached.

7. A non-transitory computer readable storage medium having instructions stored thereon that, when executed by a processor, implement an omnidirectional media playback method, comprising:

obtaining viewpoint looping information associated to a current viewpoint from omnidirectional media data; and looping the current viewpoint according to the viewpoint looping information;

wherein the viewpoint looping information comprises: a maximum number of loops, loop start time and loop activation time;

wherein the maximum number of loops is configured to indicate the maximum number of loops that OMAF player shall perform on the current viewpoint, the loop start time is configured to indicate time in an omnidirectional media timeline of the current viewpoint at which playout of the current viewpoint shall restart when a loop is performed, and the loop activation time is configured to indicate time in the omnidirectional media timeline of the current viewpoint at which the loop shall be initiated;

wherein the viewpoint looping information comprises: a destination viewpoint configured to indicate a viewpoint ID of the destination viewpoint of a viewpoint switching that shall occur at the end of the playout of the current viewpoint once the maximum number of loops has been reached, and the instructions further implement the following:

switching to the destination viewpoint at the end of the playout of the current viewpoint once the maximum number of loops has been reached.

8. The terminal device in accordance with claim 6, wherein when a value of the maximum number Is set to a predefined value or if an element of maximum number of loops is no present in the viewpoint looping information, the maximum number of loops is infinite.

9. The terminal device in accordance with claim 6, wherein when the loop start time is not present in the viewpoint looping information, the playout shall start at the beginning of the omnidirectional media timeline of the current viewpoint.

10. The terminal device in accordance with claim 6, wherein when the loop activation time is not present in the viewpoint looping information, a loop shall occur at the end of the omnidirectional media timeline of the current viewpoint.

11. The terminal device in accordance with claim 6, wherein the viewpoint looping information is defined as an ISOBMFF structure.

* * * * *